(12) United States Patent
Imanishi

(10) Patent No.: US 7,546,536 B2
(45) Date of Patent: Jun. 9, 2009

(54) COMMUNICATION DEVICE, COMMUNICATION METHOD, AND COMPUTER USABLE MEDIUM

(75) Inventor: Motoki Imanishi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 971 days.

(21) Appl. No.: 10/672,478

(22) Filed: Sep. 26, 2003

(65) Prior Publication Data

US 2004/0064498 A1 Apr. 1, 2004

(30) Foreign Application Priority Data

Sep. 30, 2002 (JP) ............... 2002-287536

(51) Int. Cl.
G06F 3/00 (2006.01)
G06F 3/048 (2006.01)
G06F 17/21 (2006.01)

(52) U.S. Cl. .................. 715/753; 463/37; 709/201; 715/269; 715/757; 715/758

(58) Field of Classification Search .......... 709/201; 715/758, 753, 757, 269; 463/37
See application file for complete search history.

(56) References Cited

U.S. PATENT DOCUMENTS

| | | | |
|---|---|---|---|
| 6,025,841 A * | 2/2000 | Finkelstein et al. | 715/803 |
| 6,392,667 B1 * | 5/2002 | McKinnon et al. | 715/738 |
| 6,784,901 B1 * | 8/2004 | Harvey et al. | 715/757 |
| 2001/0008850 A1 * | 7/2001 | Komata | 463/37 |

FOREIGN PATENT DOCUMENTS

| | | |
|---|---|---|
| EP | 1215867 A2 | 6/2002 |
| JP | 10-261099 | 9/1998 |
| JP | 2000-172392 | 6/2000 |
| JP | 2000-207304 | 7/2000 |
| JP | 2001-034410 | 2/2001 |
| JP | 2001-84411 | 3/2001 |
| JP | 2001-084441 | 3/2001 |
| JP | 2001-228794 | 8/2001 |
| JP | 2001-236162 | 8/2001 |
| JP | 2002-202943 | 7/2002 |

OTHER PUBLICATIONS

Goto et al., "Capture Guide First Volume for Sakura Taisen 3—is Paris burning?-", SOFTBANK Publishing Co., First Edition, May 17, 2001, p. 51.
European Search Report EP03755687.

* cited by examiner

Primary Examiner—Steven P Sax
Assistant Examiner—Grant D Johnson
(74) Attorney, Agent, or Firm—Townsend and Townsend and Crew LLP

(57) ABSTRACT

A letter string editing unit of a communication device receives an edit instruction for a letter string, and edits a letter string in accordance with the instruction. A decide input reception unit receives a decide instruction for the letter string together with operation strength. When the decide instruction is received, a sending unit sends a sender side message specifying the edited letter string and strength information associated with the operation strength to another communication device. A reception unit receives a receiver side message specifying a letter string to be displayed and strength information from another communication device. A font acquiring unit acquires information of a font having a size pre-associated with the specified strength information. A display image generation unit generates a display image by depicting the specified letter string in accordance with the acquired font information. A display unit displays the generated display image.

9 Claims, 12 Drawing Sheets

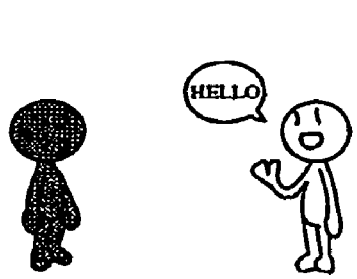 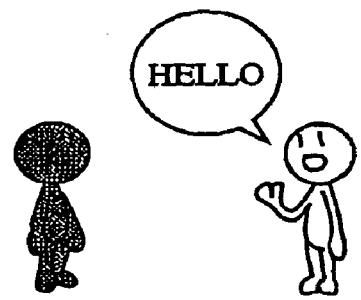
FIG.9A  FIG.9B
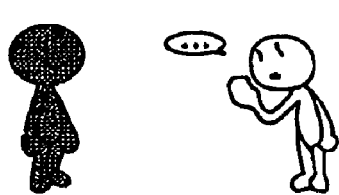 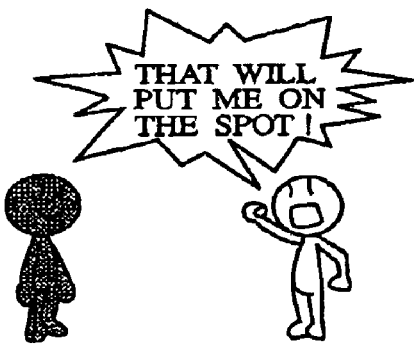
FIG.9C  FIG.9D
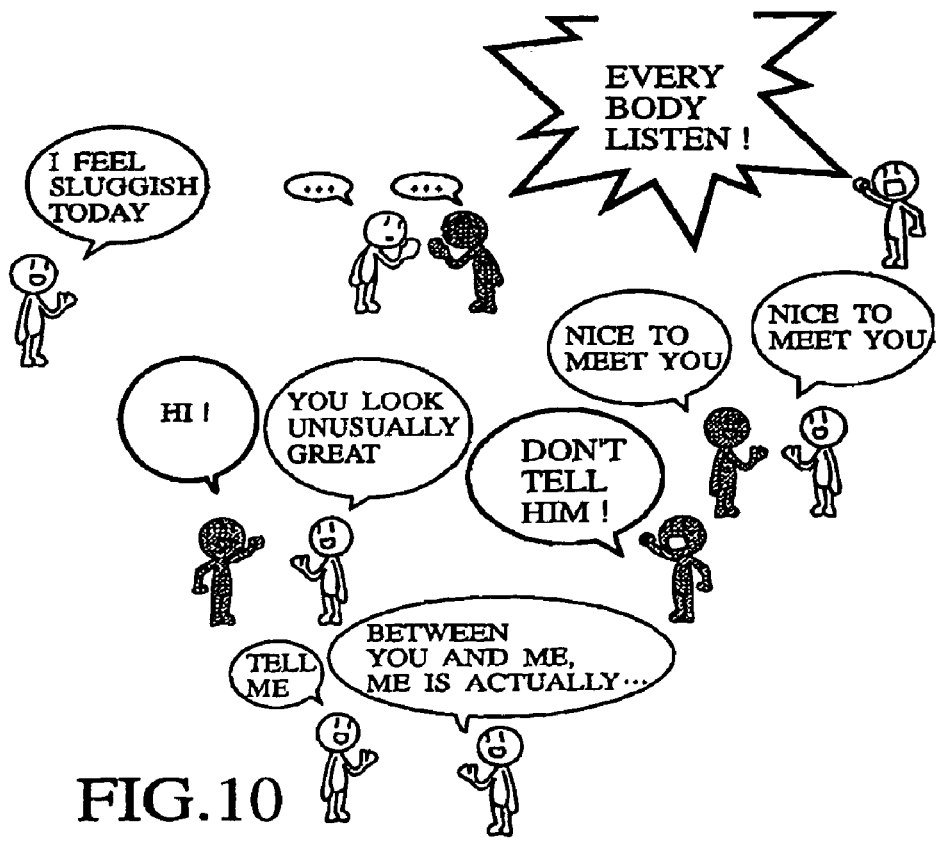
FIG.10

COMMUNICATION DEVICE, COMMUNICATION METHOD, AND COMPUTER USABLE MEDIUM

BACKGROUND OF THE INVENTION

1. Field of the Invention

The present invention relates to a communication device, a program, and a communication method.

2. Description of the Related Art

Conventionally, there has been proposed a chat communication technique for enabling communication between terminals connected to each other via a computer communication network such as the Internet.

In the chat communication technique, a plurality of terminals are connected to each other via a chat server, or via no chat server. When a user of one terminal edits a letter string and decides on this letter string, this letter string is sent to another terminal. The terminal, which receives this letter string, displays the letter string on the screen.

By each terminal performing such an operation, a "dialogue" via computers is realized between users who operate different terminals.

The chat communication technique has gained attention as a technique for developing communication between a plurality of users, particularly in the field of online games utilizing an electronic conference room and a computer communication network.

In the meantime, it is well known that in daily conversation, mutual understanding is well promoted by changing the loudness of voice in accordance with the degree of excitation and emotion of a participant in the conversation and the message the participant wants to communicate, or by adding gestures.

In this context, also in the chat communication technique, there is a strong demand for a technique for easily acquiring and transmitting information corresponding to the degree of excitation and emotion of a user and the message the user wants to communicate, and presenting this information to the chat partner, in order to further develop communication between the users.

The present invention was made to solve this problem, and an object of the present invention is to provide a communication device suitable for easily acquiring and transmitting information such as the degree of excitation of a user, etc., and presenting this information to the communication partner, and a program and a communication method for realizing this communication device by a computer.

SUMMARY OF THE INVENTION

To achieve the above object, a communication device according to a first aspect of the present invention is a communication device comprising a letter string editing unit, a decide input reception unit, a sending unit, a reception unit, a display image generation unit, and a display unit, wherein:

the letter string editing unit receives an edit instruction for editing a letter string from a user and edits a letter string in accordance with the received edit instruction;

the decide input reception unit receives a decide instruction from the user together with an operation strength of the user for inputting the decide instruction;

in a case where the decide input is received, the sending unit sends a sender side message specifying the edited letter string and strength information associated with the operation strength, to another communication device which is communicably connected to the communication device;

the reception unit receives a receiver side message specifying a letter string to be displayed and strength information, from another communication device communicably connected to the communication device;

the display image generation unit generates a display image by depicting the letter string specified in the receiver side message, in accordance with a format which is pre-associated with the strength information specified in the receiver side message; and the display unit displays the generated display image.

A communication device according to a second aspect of the present invention is a communication device comprising a letter string editing unit, a decide input reception unit, a sending unit, a reception unit, a display image generation unit, and a display unit, wherein:

the letter string editing unit receives an edit instruction for editing a letter string from a user together with an operation strength of the user for inputting the edit instruction, and edits a letter string in accordance with the edit instruction;

the decide input reception unit receives a decide instruction from the user;

in a case where the decide instruction is received, the sending unit sends a sender side message specifying the edited letter string and strength information associated with he operation strength, to another communication device which is communicably connected to the communication device;

the reception unit receives a receiver side message specifying a letter string to be displayed and strength information from another communication device communicably connected to the communication device;

the display image generation unit displays a display image by depicting the letter string specified in the receiver side message, in accordance with a format which is pre-associated with the strength information specified in the receiver side message; and the display unit displays the generated display image.

The communication device may further comprise a font acquiring unit.

The font acquiring unit may acquire font information designating a font having a size which is pre-associated with the strength information specified in the receiver side message, and the display image generation unit may generate the display image by depicting the letter string specified in the receiver side message in accordance with the acquired font information.

The communication device may further comprise a background image acquiring unit.

The background image acquiring unit may acquire background image information which is pre-associated with the strength information specified in the receiver side message, and the display image generation unit may display the display image by depicting the letter string specified in the receiver side message in accordance with the acquired font information, and by overlaying the letter string on the acquired background image information.

The communication device may further comprise a display time acquiring unit.

The display time acquiring unit may acquire a display time which is pre-associated with the strength information specified in the receiver side message, and the display unit may finish display of the generated display image, when the acquired display time passes after display of the display image is started.

The communication device may further comprise a display position candidate acquiring unit and a display position selection unit.

The sending unit may send the sender side message in which a user identifier assigned to the user is further specified, a user identifier may further be specified in the receiver side message received by the reception unit, the display position candidate acquiring unit may acquire a plurality of display position candidates which are associated with the user identifier specified in the received receiver side message, the display position selection unit may provisionally display the display image corresponding to the user identifier specified in the receiver side message, at the respective acquired display position candidates, in order to calculate an overlap area which is occupied together by any already-displayed display image corresponding to a user identifier other than the specified user identifier and by the provisionally-displayed display image at the respective acquired display position candidates, and may select one display position candidate at which the overlap area becomes the smallest of all the overlap areas calculated for the respective acquired display position candidates, and the display unit may display the display image corresponding to the specified user identifier at the selected display position candidate.

The communication device may further comprise a display position candidate acquiring unit and a display position selection unit.

The sending unit may send the sender side message in which a user identifier assigned to the user is further specified, a user identifier may further be specified in the receiver side message received by the reception unit, the display position candidate acquiring unit may acquire a plurality of display position candidates which are associated with the user identifier specified in the receiver side message and which are positions in a virtual three-dimensional space, the display position selection unit may calculate "a smallest value of an angle formed by a vector extending from a predetermined viewpoint to each of the plurality of acquired display position candidates in the virtual three-dimensional space, and by a vector extending from the predetermined viewpoint to a position in the virtual three-dimensional space of any already-displayed display image corresponding to a user identifier other than the user identifier specified in the receiver side message", and may select one display position candidate whose calculated smallest value is the largest of all the calculated smallest values, and the display unit may display a rendered image of the display image corresponding to the specified user identifier, which is arranged at the selected display position candidate in the virtual three-dimensional space, and which is seen from the predetermined viewpoint.

In a case where a size when seen from the predetermined viewpoint, of the display image corresponding to the specified user identifier which is arranged at the selected display position candidate in the virtual three-dimensional space, is smaller than a predetermined smallest size, the display unit may expand the display image to have a size equal to or larger than the predetermined smallest size.

The communication device may further comprise a character image position acquiring unit.

The character image position acquiring unit may acquire a character image and a character display position which are associated with the user identifier specified in the receiver side message, the display position candidate acquiring unit may refer to each of a plurality of pairs of directions and distances, and may acquire as a display position candidate, a position which is apart from the acquired character display position in a direction in a pair, by a distance in the same pair, and the display unit may further display the acquired character image at the acquired character display position.

A program according to a third aspect of the present invention is a program for controlling a computer (including a game console which is communicably connected to another game console via a computer communication network) to function as the letter string editing unit, the decide input reception unit, the sending unit, the reception unit, the display image generation unit, and the display unit which are comprised in the communication device according to the first or second aspect.

A communication method according to a fourth aspect of the present invention is a communication method comprising a letter string editing step, a decide input receiving step, a sending step, a receiving step, a font acquiring step, a display image generating step, and a displaying step, wherein:

the letter string editing step receives an edit instruction for editing a letter string from a user and edits a letter string in accordance with the edit instruction;

the decide input receiving step receives a decide instruction from the user together with an operation strength of the user for inputting the decide instruction;

in a case where the decide instruction is received, the sending step sends a sender side message specifying the edited letter string and strength information associated with the operation strength, to another communication device;

the receiving step receives a receiver side message specifying a letter string to be displayed and strength information from another communication device;

the font acquiring step acquires font information designating a font having a size which is pre-associated with the strength information specified in the receiver side message;

the display image generating step generates a display image by depicting the letter string specified in the receiver side message in accordance with the acquired font information; and the displaying step displays the generated display image.

A communication method according to a fifth aspect of the present invention is a communication method comprising a letter string editing step, a decide input receiving step, a sending step, a receiving step, a font acquiring step, a display image generating step, and a displaying step, wherein:

the letter string editing step receives an edit instruction for editing a letter string from a user together with an operation strength of the user for inputting the editing instruction, and edits a letter string in accordance with the edit instruction;

the decide input receiving step receives a decide instruction from the user;

in a case where the decide instruction is received, the sending step sends a sender side message specifying the edited letter string and strength information associated with the operation strength to another communication device;

the receiving step receives a receiver side message specifying a letter string to be displayed and strength information from another communication device;

the font acquiring step acquires font information designating a font having a size which is pre-associated with the strength information specified in the receiver side message;

the display image generating step generates a display image by depicting the letter string specified in the receiver side message in accordance with the acquired font information; and the displaying image displays the generated display image.

BRIEF DESCRIPTION OF THE DRAWINGS

These objects and other objects and advantages of the present invention will become more apparent upon reading of the following detailed description and the accompanying drawings in which:

FIG. 9 are explanatory diagrams showing display examples of cases where a chat process is displayed by "a character and a speech balloon";

FIG. 10 is an explanatory diagram showing a display example of a case where a chat process is displayed by "characters and speech balloons";

DETAILED DESCRIPTION OF THE PREFERRED EMBODIMENTS

Embodiments of the present invention will be explained below. The embodiments to be explained below are for explanation, and not for limiting the scope of the present invention. Accordingly, even if one with ordinary skill in the art can employ an embodiment wherein individual elements or all elements included in the embodiments to be explained below are substituted for by equivalents of those, such an embodiment will be included in the scope of the present invention.

First Embodiment

Figure 1:
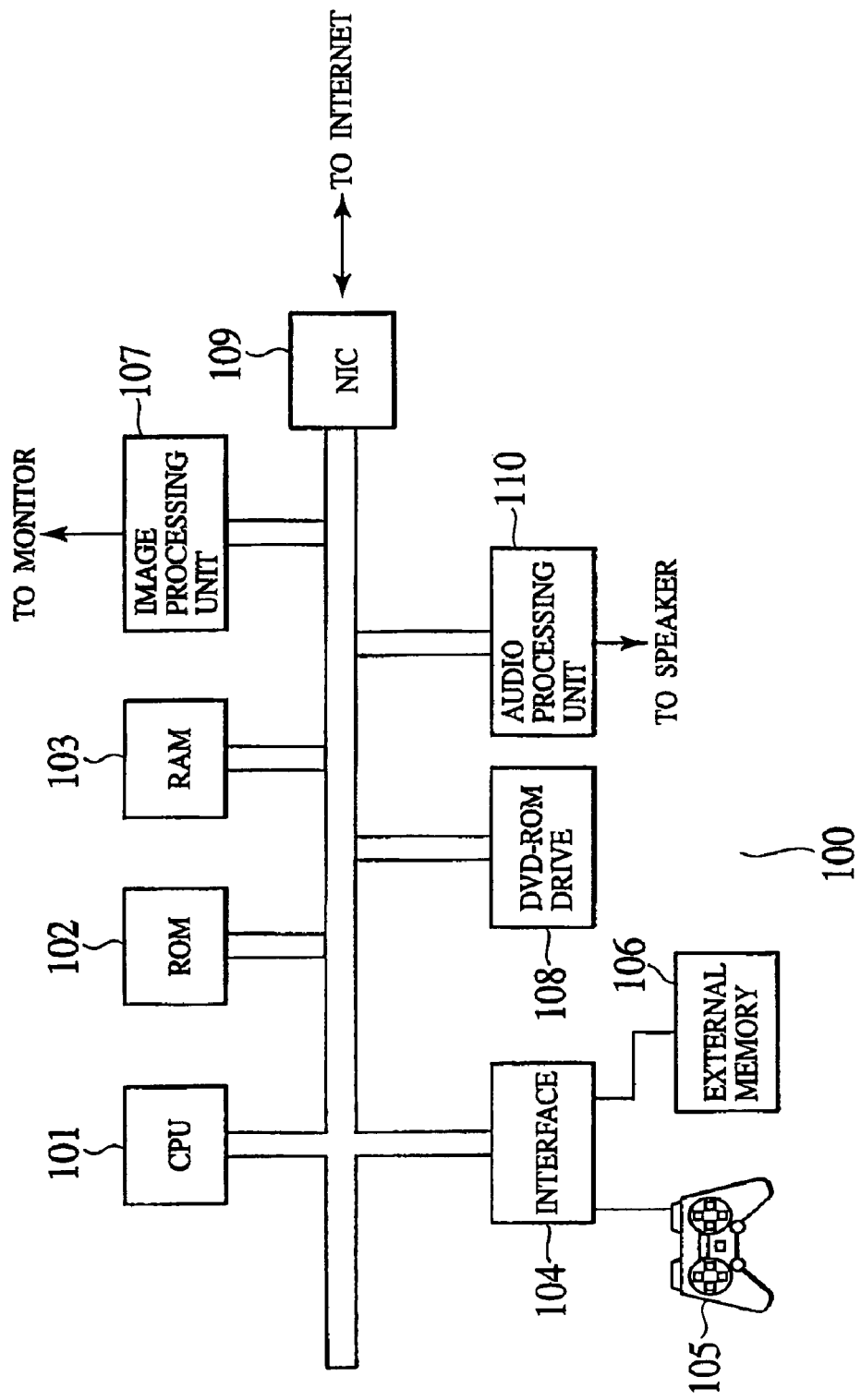
FIG. 1 is an exemplary diagram showing a schematic structure of a typical game console in which a communication device according to a first embodiment of the present invention is realized.

FIG. 1 is an exemplary diagram showing a schematic structure of a typical game console in which a communication device according to a first embodiment of the present invention is realized. The following explanation will be made with reference to FIG. 1.

A game console 100 comprises a CPU (Central Processing Unit) 101, a ROM (Read Only Memory) 102, a RAM (Random Access Memory) 103, an interface 104, a controller 105, an external memory 106, an image processing unit 107, a DVD (Digital Versatile Disk)-ROM drive 108, an NIC (Network Interface Card) 109, and an audio processing unit 110.

The communication device of the present embodiment is realized by installing a DVD-ROM storing a game program having a chat communication function and data on the DVD-ROM drive 108, and switching on the power of the game console 100 to start the program.

The CPU 101 controls the entire operation of the game console 100, is connected to each structural component, and exchanges control signals and data with them.

The ROM 102 stores an IPL (Initial Program Loader) which is started immediately after the power is turned on. With the IPL started, the program stored in the DVD-ROM is read out into the RAM 103, and the CPU 101 starts execution of this program. Further, the ROM 102 stores a program for an operating system necessary for controlling the entire operation of the game console 100, and various data.

The RAM 103 temporarily stores data and programs. Programs and data read out from the DVD-ROM and other data necessary for progress of the game and chat communication are retained in the RAM 103.

Figure 2:
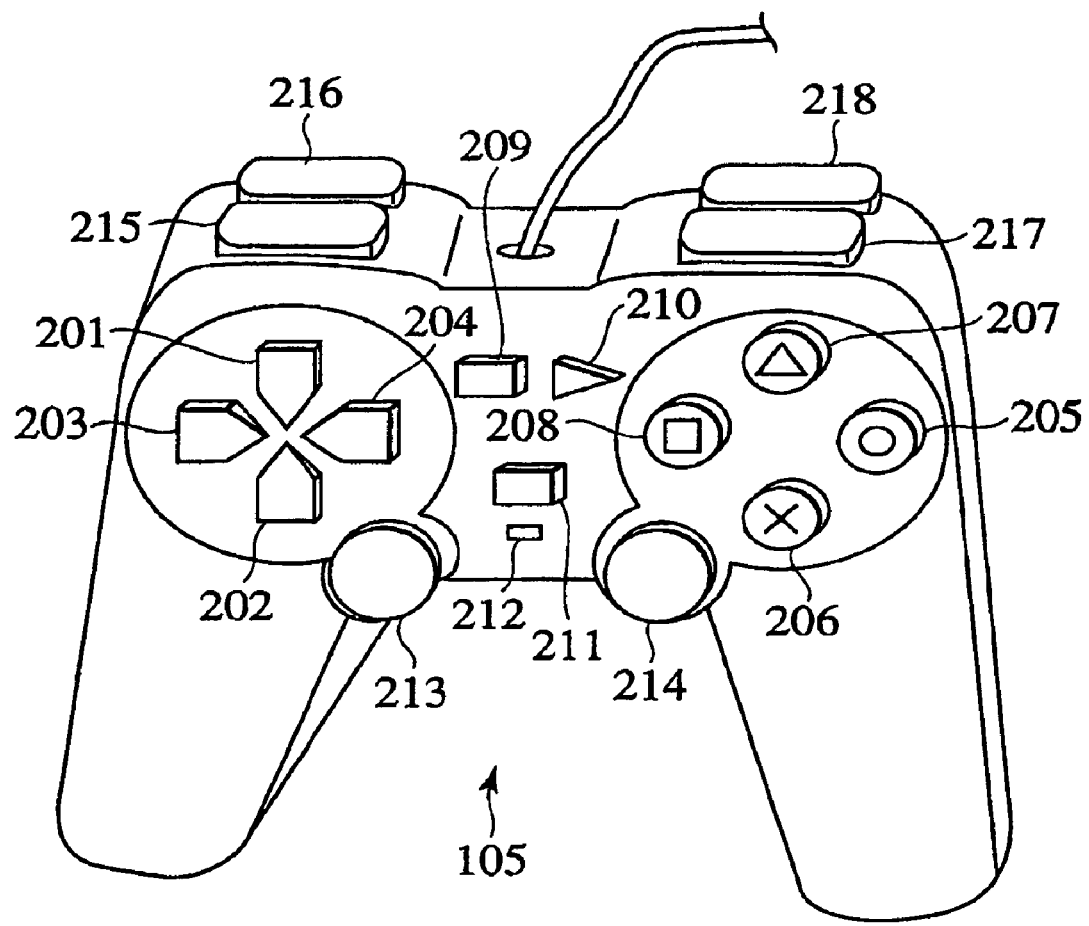
FIG. 2 is an explanatory diagram showing an appearance of a controller of the game console.

The controller 105 connected via the interface 104 receives input of an operation given by a user when playing the game. FIG. 2 is an explanatory diagram showing the appearance of the controller 105. The following explanation will be made with reference to FIG. 2.

Provided on the left side of the controller 105 are a ↑ button 201, a ↓ button 202, a ← button 203, and a → button 204 used for performing input of operations indicating the upward, downward, leftward, and rightward directions.

Provided on the right side of the controller 105 are a circle button 205 used for performing input of "decide" operation, a cross button 206 used for performing input of "cancel" operation, a triangle button 207 used for performing input of an instruction such as an instruction for displaying menus, and a square button 208 used for performing input of other instructions. (Note that the buttons 205 to 208 are represented not by symbols, but by words corresponding to the symbols. The same applies hereinafter.)

Provided on the center of the controller 105 are a SELECT button 209, and a START button 210, and other than those, an ANALOG button 211 for instructing start/stop of analog input, and an indicator 212 for displaying whether an analog input is valid or invalid.

Provided on the lower center of the controller 105 are joysticks 213 and 214 for performing input of an instruction having a magnitude in a direction not limited to the upward, downward, leftward, and rightward directions.

Further, provided on the top of the controller 105 are, an L1 button 215, an L2 button 216, an R1 button 217, and an R2 button 218 which can be used for input of various instructions.

Each of the buttons 201 to 208, and 215 to 218 of the controller 105 is provided with a pressure sensor, so that which of those buttons is pushed can be detected or the pressure level of the pushing operation of a user can be evaluated by 256 stages from 0 to 255, in a case where analog input is valid.

The joysticks 213 and 214 of the controller 105 are provided with deformation gauges, so that in which direction and how much the joysticks 213 and 214 are deformed can be detected.

Returning to FIG. 1, the external memory 106, which is attachably and detachably connected via the interface 104, rewritably stores data representing a progress status of a game, and data representing a log (record) of chat communication, etc. A user can store such data in the external memory 106 when necessary, by inputting an instruction via the controller 105.

A DVD-ROM to be installed on the DVD-ROM drive 108 stores a program for realizing a game, and image data and audio data included in the game. Under the control of the CPU 101, the DVD-ROM drive 108 performs an operation for reading out from the DVD-ROM installed thereon to read out a necessary program and necessary data, which are to be temporarily stored in the RAM 103, etc.

The image processing unit 107 processes data read out from a DVD-ROM under the control of the CPU 101 and an image operation processor (not shown) included in the image processing unit 107, and after this, stores the data in a frame memory (not shown) included in the image processing unit 197. Image information stored in the frame memory is converted into a video signal at a predetermined synchronization timing and output to a monitor (not shown) connected to the image processing unit 107. Due to this, display of various images is available.

The image operation processor can execute an overlay operation for two-dimensional images, a transparency operation such as alpha blending, and various saturation operations rapidly.

Further, the image operation processor can rapidly execute an operation for rendering polygon information which is arranged in a virtual three-dimensional space and to which information on various textures is added, by a Z-buffer method, and obtaining a rendered image of the polygon arranged in the virtual three-dimensional space and overlooked from a predetermined viewpoint.

Further, the CPU 101 and image operation processor in cooperation with each other, can depict a letter string in a frame memory as a two-dimensional image, or can depict a letter string on the surface of each polygon, in accordance with font information defining a shape of letters. Font information is stored in the ROM 103, however, specialized font information stored in the DVD-ROM may be used instead.

The NIC 109 is for connecting the game console 100 to a computer communication network (not shown) such as the Internet. The NIC 109 comprises any of a modem following the 10BASE-T/100BASE-T standard used for constructing a LAN (Local Area network), an analog modem for gaining connection to the Internet by using a telephone line, an ISDN (Integrated Services Digital Network) modem, an ADSL (Asymmetric Digital Subscriber Line) modem, and a cable modem for gaining connection to the Internet by using a cable television line, and an interface (not shown) for intermediating between any of the above-mentioned modems and the CPU 101.

The audio processing unit 110 converts audio data read out from a DVD-ROM into an analog audio signal, and outputs the analog audio signal to a speaker (not shown) connected to the audio processing unit 110. Further, the audio processing unit 110 produces sound effect data or music data that should be sounded in the process of a game, and outputs a sound corresponding to the produced data.

The game console 100 may be constructed such that it uses a large capacity external storage device such as a hard disk, so as to replace the function of the ROM 102, the RAM 103, the external memory 106, and a DVD-ROM installed in the DVD-ROM drive 108.

Furthermore, an embodiment may be employed wherein a keyboard for receiving editing and inputting of a letter string from a user, and a mouse for receiving input for designating and selecting certain positions are connected to the game console 100. Further, a general-purpose personal computer may be used instead of the game console 100 of the present embodiment.

Figure 3:
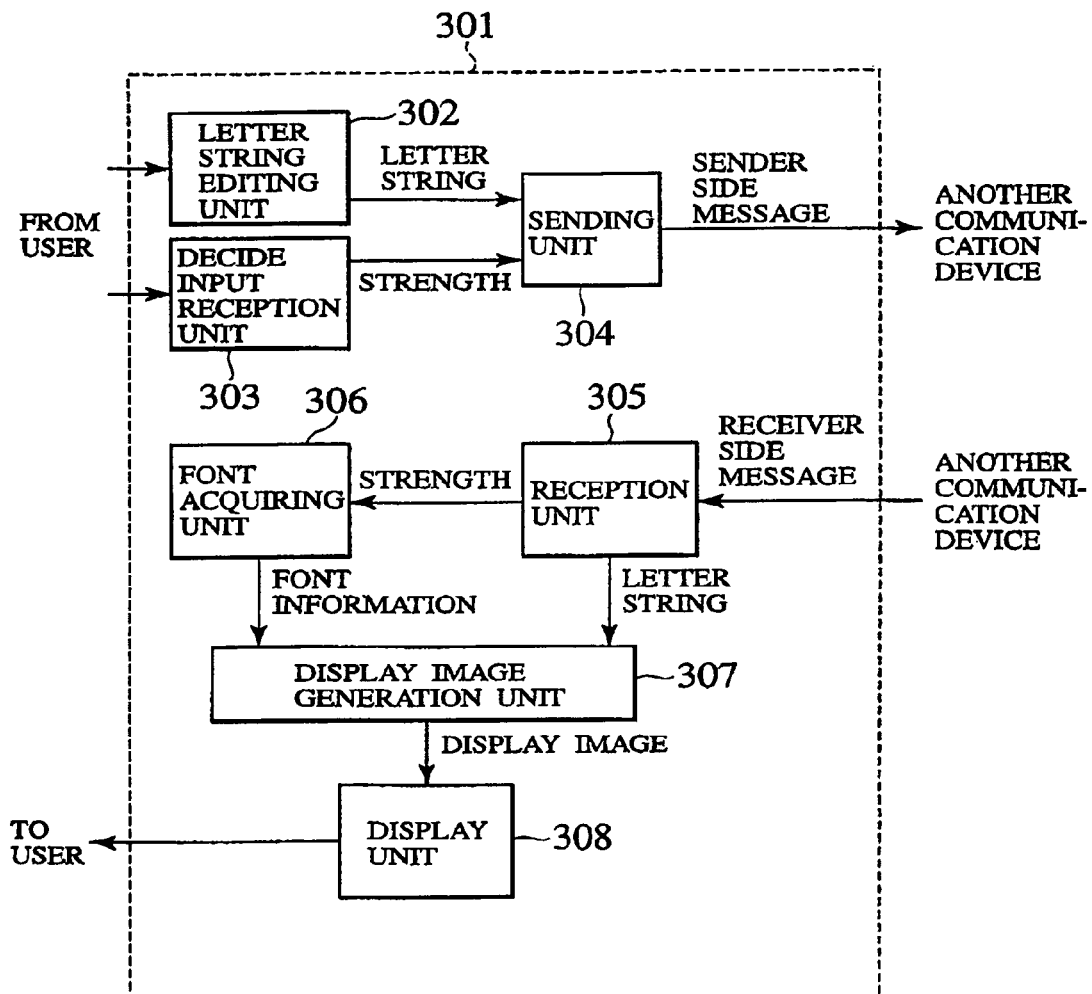
FIG. 3 is an exemplary diagram showing a schematic structure of the communication device according to the first embodiment of the present invention.

FIG. 3 is an exemplary diagram showing a schematic structure of the communication device according to the present embodiment.

Figure 4:
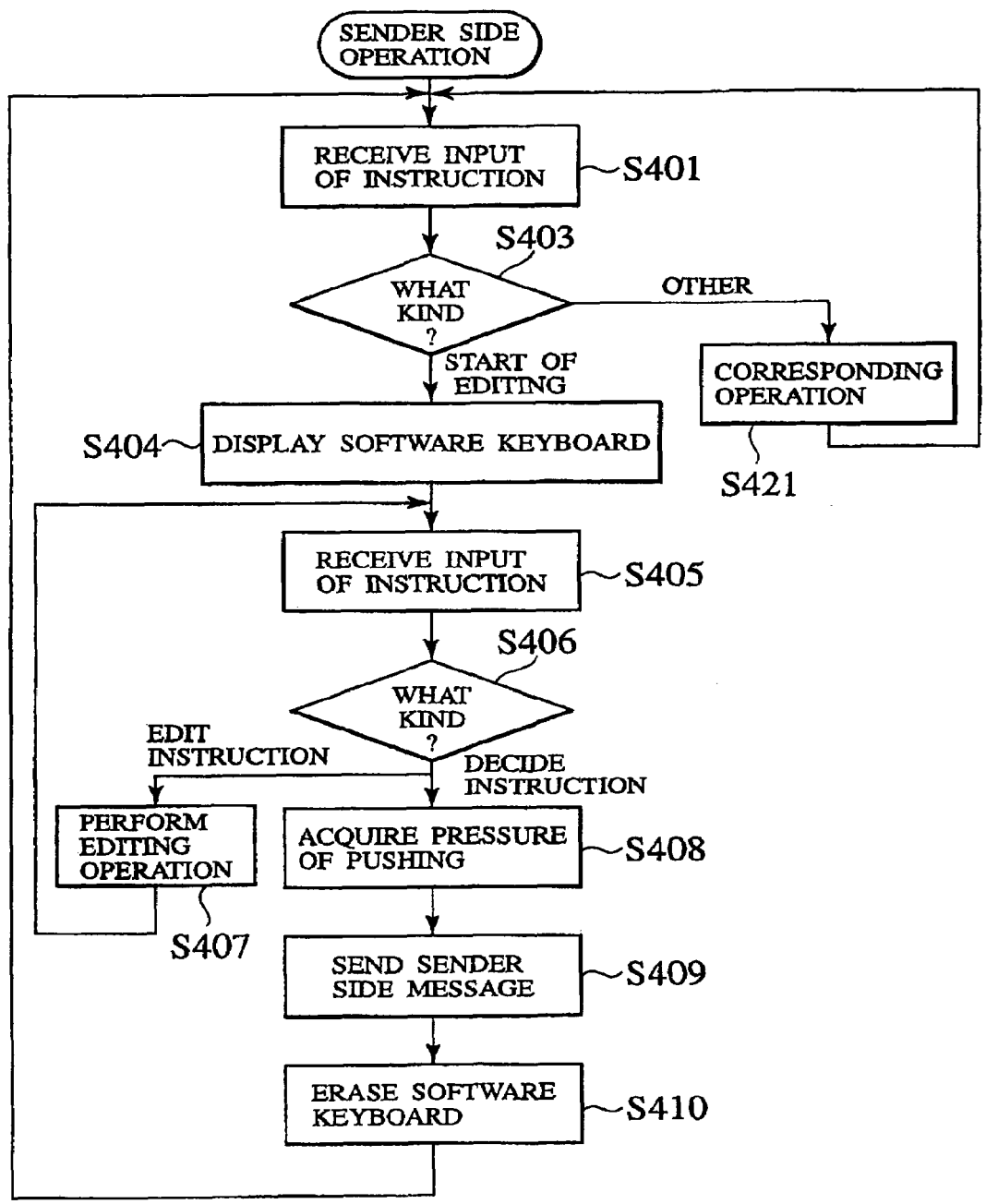
FIG. 4 is a flowchart showing a flow of a control of a sender side operation performed by the communication device.

FIG. 4 is a flowchart showing a flow of a control of a sender side operation, which is performed by the communication device.

Figure 5:
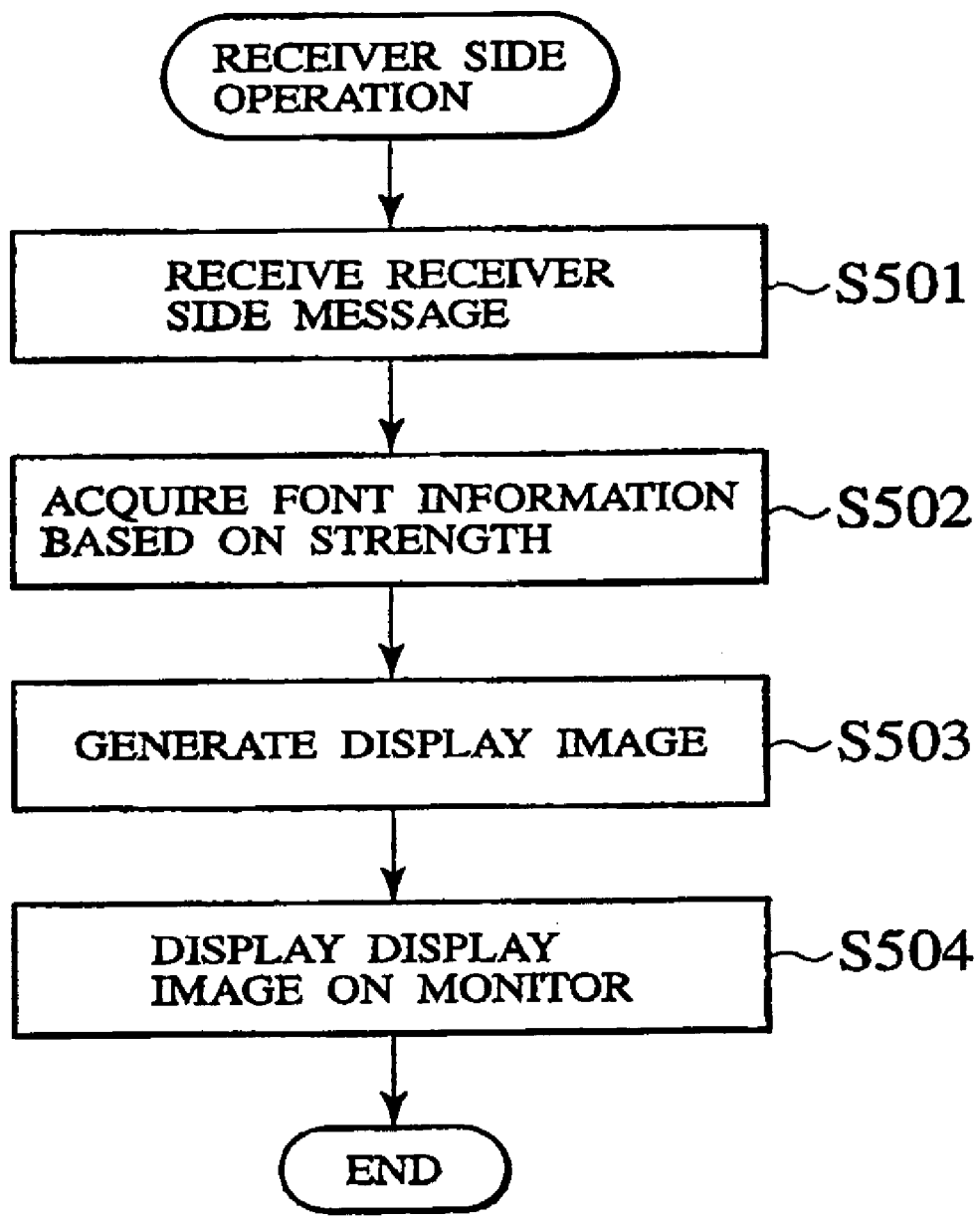
FIG. 5 is a flowchart showing a flow of a control of a receiver side operation performed by the communication device.

FIG. 5 is a flowchart showing a flow of a control of a receiver side operation, which is performed by the communication device.

As described above, the communication device according to the present embodiment is realized by execution of a program stored in a DVD-ROM by the game console 100.

The following explanation will be made with reference to those drawings.

In the game console 100, a sender side operation and a receiver side operation are performed in parallel. That is, in the sender side operation, input of instructions from a user is waited, and performance of various operations is repeated in response to input of instructions. On the other hand, in the receiver side operation, a message from a computer communication network is waited, and performance of various operations is repeated in response to the received message.

Because these two operations are performed in parallel, it is possible to employ various techniques such as a time sharing operation by time division, a cut-in operation by operating the controller 105 or by reception by the NIC 109, and a pseudo parallel operation utilizing a co-routine, etc.

The communication device 301 according to the present embodiment comprises a letter string editing unit 302, a decide input reception unit 303, a sending unit 304, a reception unit 305, a font acquiring unit 306, a display image generation unit 307, and a display unit 308.

According to the present embodiment, the sender side operation is performed by the letter string editing unit 302, the decide input reception unit 303, and the sending unit 304, and the receiver side operation is performed by the reception unit 305, the font acquiring unit 306, the display image generation unit 307, and the display unit 308.

The sender side operation will now be explained with reference to FIG. 3 and FIG. 4.

The CPU 101 waits for a certain instruction to be input by a user via the controller 105, and receives an instruction when it detects input of the instruction (step S401). During this waiting state, the above-mentioned receiver side operation and other various operations can be performed separately from the sender side operation by means of co-routines.

The CPU 101 checks the kind of the received instruction (step S403).

In a case where the instruction is something other than an instruction for starting editing of a message to be sent by chat (step S403; Other), the CPU 101 performs an operation corresponding to the received instruction (step S421), and returns to step S401.

In a case where the instruction is an instruction for starting editing (step S403; Start of Editing), the CPU 101 displays a software keyboard on the screen (step S404), and receives an input of a further instruction via the controller 105 (step S405).

Figure 6:
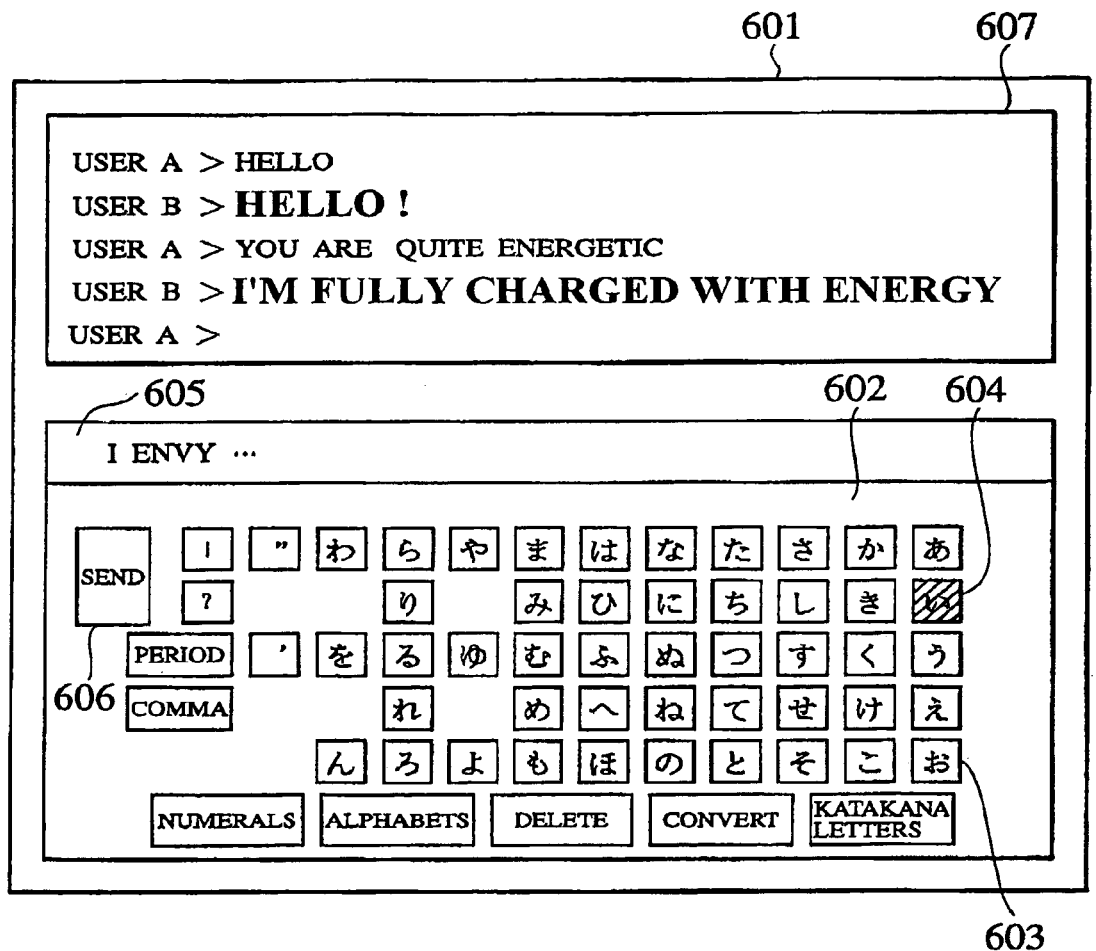
FIG. 6 is an explanatory diagram showing a state of a monitor display screen on which a software keyboard is displayed.

FIG. 6 is an explanatory diagram showing the monitor display screen on which the software keyboard is displayed.

The software keyboard 602 is displayed on the lower part of the monitor display screen 601. The software keyboard 602 has a table of the Japanese syllabary 603 on which hiragana letters from, a voiced consonant mark, a Japanese voiceless bilabial plosive consonant mark, punctuation marks, ALPHABETS mark and other various marks are displayed.

A user can select a desired hiragana letter by positioning a cursor 604 on the desired letter while operating the ↑ button 201, the ↓ button 202, the ← button 203, and the → button 204, and after this, pushing the circle button 205. Selected hiragana letters are displayed in a letter string presentation area 605 in the order of selection. If a user select ALPHA-BETS mark, an alphabetical software keyboard is displayed and a user can select desired alphabetical letters in the same manner.

If the cross button 206 is pushed, the last hiragana letter among the hiragana letters displayed in the letter string presentation area 605 is deleted.

Other than using such a software keyboard, a letter string can be edited by using an external keyboard, as long as such an external keyboard is connected to the game console 100. These input operations are handled as an input of an edit instruction.

If the cursor 604 is moved to a send button 606 in the software keyboard 602, and then the circle button 205 is pushed, this operation is handled as an input of a decide instruction.

The CPU 101 checks the kind of a received instruction (step S406). If the received instruction is an edit instruction (step S406; Edit Instruction), the CPU 101 performs an operation corresponding to the edit instruction as described above (step S407), and returns to step S405. That is, the CPU 101 functions as the letter string editing unit 302 in cooperation with the controller 105.

On the other hand, if the received instruction is a decide instruction (step S406; Decide Instruction), the CPU 101 acquires a pressure of pushing the circle button 205 by he user (step S408). As described above, according to the game console 100, the pressure of a pushing operation is expressed as a value that may be varied in 256 stages from 0 to 255. This value is strength information. The larger the value of the strength information is, the larger the pressure is, which means the user is operating energetically by consuming his/her physical power. That is, the CPU 101 functions as the decide input reception unit 303 in cooperation with the controller 105.

The CPU 101 sends a sender side message that specifies the edited letter string and acquired pressure information to another communication device connected to the game console 100 via the NIC 109 (step S409), erases the software keyboard (step S410), and returns to step S401. That is, the CPU 101 functions as the sending unit 304 in cooperation with the NIC 109.

Other than this operation, in a case where the received instruction is some other kind of instruction, the CPU 101 performs an operation corresponding to this instruction. However, in order to facilitate understanding, such an operation is not shown in the flowchart.

By designing the user interface so that an edited letter string message is sent in response to a pushing operation to the circle button 205 as described above, a user shows a tendency that when he/she gets excited and emotional and thus wants to transmit a message with a strong willpower, he/she pushes the circle button 205 with a strong power without knowing it him/herself.

The strength information may be acquired not only from the pressure of pushing the circle button 205, but also from the joysticks 213 and 214 by deforming the joysticks 213 and 214, which means that a decide instruction is input, and by detecting the amount of deformation with the deformation gauges.

Further, in a case where the game console 100 comprises a mike, a voice uttered by the user may be picked up by the mike, and if the voice is equal to or greater than a predetermined sound volume, this voice may be recognized as an input of a decide instruction and the sound volume of this voice may be used as the strength information.

A flow of a control of the receiver side operation, which is started in response to that a sender side message is transmitted through a computer communication network and arrives at the communication device 301 as a receiver side message, will now be explained with reference to FIG. 3 and FIG. 5.

In the receiver side operation, the CPU 101 receives a receiver side message which specifies a letter string to be displayed and strength information via the NIC 109 (step S501). That is, the CPU 101 functions as the reception unit 305 in cooperation with the NIC 109.

Then, the CPU 101 acquires font information specifying a font size which is associated in advance with the strength information specified by the receiver side message, from the ROM 102 or the DVD-ROM installed on the DVD-ROM drive 108 (step S502). That is, the CPU 101 functions as the font acquiring unit 306 in cooperation with an information recording medium storing such font information. In acquiring font information, the following ranking method may be employed.

strength information 0 to 15—6 point font information
strength information 16 to 31—8 point font information
strength information 32 to 47—10 point font information
strength information 48 to 63—11 point font information
strength information 64 to 79—12 point font information
strength information 80 to 95—14 point font information
strength information 96 to 111—16 point font information
strength information 112 to 127—18 point font information
strength information 128 to 143—20 point font information
strength information 144 to 159—24 point font information
strength information 160 to 175—26 point font information
strength information 176 to 191—28 point font information
strength information 192 to 207—36 point font information
strength information 208 to 223—48 point font information
strength information 224 to 255—72 point font information Then, the CPU 101 controls the image processing unit 107 to generate a display image obtained by depicting the letter string specified by the receiver side message in accordance with the acquired font information (step S503). That is, the CPU 101 functions as a display image generation unit 307 in cooperation with the image processing unit 107.

Next, the CPU 101 controls the image processing unit 107 to write the generated display image in the frame memory, displays it on the monitor to present the image to the user (step S504), and finishes this operation. That is, the CPU 101 functions as the display unit 308 in cooperation with the image processing unit 107.

Because the present operation is started in response to that a receiver side message arrives at the NIC 109, the flowchart shown in FIG. 5 is not a repetitive operation. However, the present operation is actually performed repeatedly.

FIG. 6 will now be referred to. In a log display area 607, there are alternately displayed letter strings input so far by the user who operates the game console 100, and letter strings input by another user who operates another game console connected to the game console 100. It is known from the log display area 607 that each letter string is displayed with letters having a font size corresponding to the pressure of pushing the circle button 205 when the user makes a decision to send.

By changing the font size to be used when displaying letters in accordance with the transmitted strength information, the user can know how excited the partner is, whether the partner gets emotional or not, and whether or not the partner wants to transmit a message with a strong willpower. This helps develop a deeper communication.

In step S408, changes in the pressure of pushing the circle button 205 when deciding to send may be followed in a small time unit, and the font size of the letters to be displayed in the letter string presentation area 605 may be changed in accordance with the pressure in each time unit, so that the user can confirm how the information to be sent by him/herself will be displayed on the partner's side (and in the log display area 607 on the side of the user him/herself).

Further, a "decide instruction" may be executed without using the send button 606 at all, but by pushing the circle button 205, changing the font size in accordance with the pushing pressure, and when a desired font size appears, pushing the R1 button 217 while keeping pushing the circle button 205.

There may be provided a user interface that would once give up sending a letter string when the user stops pushing the circle button 205 before he/she pushes the R1 button 217, and would allow the user to edit a letter string again.

Under an environment where the communication speed is sufficiently high, an embodiment may be employed wherein the letter string input so far and the pressure of pushing the circle button 205 when selecting the last letter may be sent, each time the user inputs an edit instruction. This means that the pushing operation to the circle button 205 for selecting a letter plays two roles, namely, as an edit instruction and as a decide instruction. In this case, because each letter is reflected on the partner's side soon after the letter is input, a user interface having instantaneousness can be obtained.

Another Embodiment

In the above embodiment, the pressure of pushing the circle button 205 after putting the cursor 604 on the send button 606 in the software keyboard 602 displayed on the monitor display screen 601 is detected, and the detected pressure is used as an operation strength. In the present embodiment, the value to be described below will be used as an operation strength.

That is, the pressure of pushing the ↑ button 201, the ↓ button 202, the ← button 203, and the → button 204 which are used to move the cursor 604 for selecting a letter in the software keyboard 602, and the pressure of pushing the circle button 205 after the cursor 604 is placed on a letter, are detected.

The time average value of these detected pressures is used as the strength information. When calculating the average, a weight may be adequately added.

By changing the font size of the letters to be displayed in the letter string presentation area 605 each time strength information is acquired, the user can check how the information to be sent by him/herself will be displayed on the partner side (and in the log display area 607 on the user side).

In this case, by the user changing the pressure of pushing the circle button 205 when selecting the last letter in the letter string that the user wants to send, the time average value of the pressures is changed and the font size of the letters to be displayed in the letter string presentation area 605 is also changed.

By pushing the R1 button 217 while keeping pushing the circle button 205 when a desired font size is reached, it may be assumed that a "decide instruction" is input.

Likewise the above-described embodiment, there may be provided a user interface that would once give up sending a letter string when the user stops pushing the circle button 205 before he/she pushes the R1 button 217, and allow the user to edit a letter string again.

Further, likewise the above-described embodiment, under an environment where the communication speed is sufficiently high, an embodiment may be employed wherein the letter string input so far and the pressure of pushing the circle button 205 when selecting the last letter is sent, each time the user inputs an edit instruction. This means that the pushing operation to the circle button 205 for selecting a letter plays two roles, namely, as an edit instruction and as a decide instruction. In this case, because each letter is reflected on the partner's side soon after the letter is input, a user interface having instantaneousness can be obtained.

Another Embodiment

Figure 7:
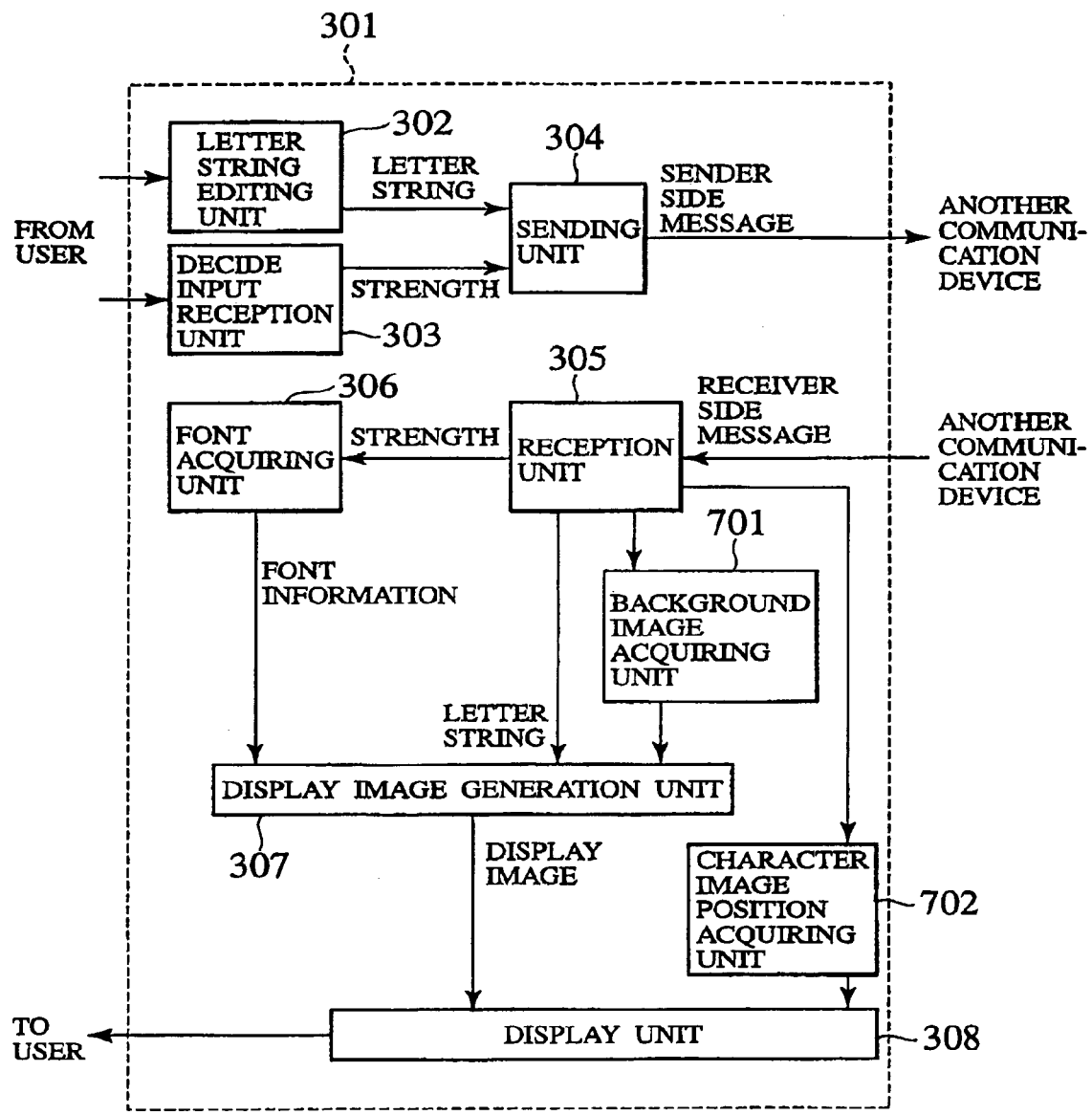
FIG. 7 is an exemplary diagram showing a schematic structure of a communication device according to another embodiment of the present invention.

FIG. 7 is an exemplary diagram showing a schematic structure of a communication device according to another embodiment of the present invention. In FIG. 7, components that have the same functions as those of the components shown in FIG. 3 are denoted by the same reference numerals. The following explanation will be made with reference to FIG. 7. To facilitate understanding, explanation for the components having the same functions as those explained in the above-described embodiment will be omitted.

The communication device 301 according to the present embodiment further comprises a background image acquiring unit 701 and a character image position acquiring unit 702, in addition to the components of the above-described embodiment.

The sending unit 304 sends a sender side message which further specifies a user identifier assigned to each user. Along with this, a receiver side message received by the reception unit 305 specifies the user identifier.

The user identifier is a string of numbers and letters assigned to a user so as not to assign the same string to other users. A user ID for gaining connection to a network and for receiving a chat communication service, an IP address assigned when gaining connection to a network, and a MAC (Media Access Control) address assigned to the NIC 109, etc. may be used as the user identifier.

The background image acquiring unit 701 acquires background image information which is previously associated with strength information specified in the receiver side message. The background image information is pre-stored in the DVD-ROM or the like, and the CPU 101 reads this out in cooperation with the DVD-ROM drive 108.

Figure 8A:
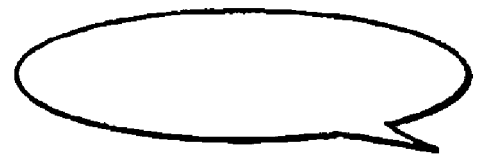
FIG. 8 are explanatory diagrams showing examples of background image information.
Figure 8B:
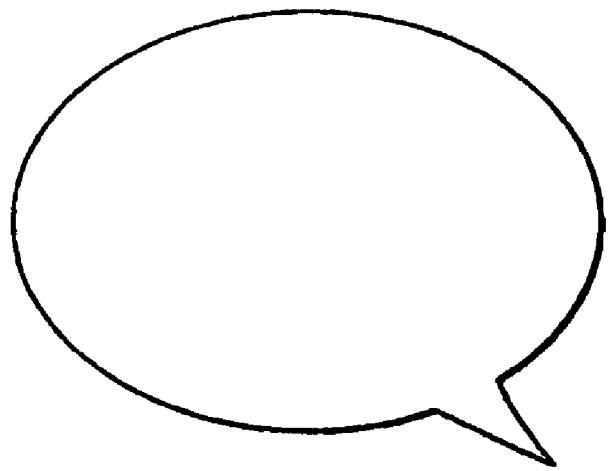
Figure 8C:
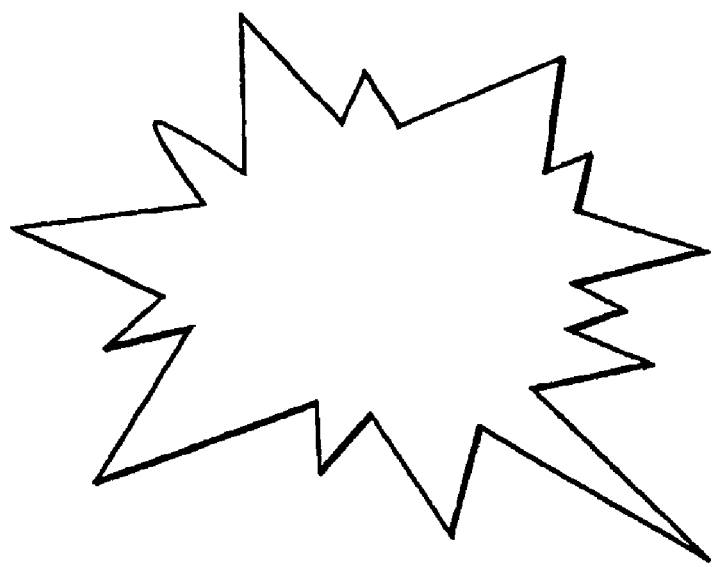

FIG. 8 are explanatory diagrams showing examples of the background image information. FIG. 8A shows a shape of a figure represented by background image information corresponding to the strength 0 to 31. FIG. 8B shows a shape of a figure represented by background image information corresponding to the strength 32 to 223. FIG. 8C shows a shape of a figure represented by background image information corresponding to the strength 224 to 255.

The display image generation unit 307 generates a display image obtained by depicting a letter string specified in the receiver side message in accordance with acquired font information and overlaying the letter string on the acquired background image information.

The character image position acquiring unit 702 acquires a character image and a character display position which are associated with the user identifier specified in the receiver side message.

The character image is an image pre-stored in the DVD-ROM or the like, or an image obtained by processing the pre-stored image. The CPU 101, (the image processing unit 107), and the DVD-ROM drive 108 acquire the character image in cooperation with each other.

The character display position associated with the user identifier, is pre-set in the RAM 103 or the like.

For example, in a case where communication devices 301 are mutually connected via a chat communication server, a plurality of positions for character display are prepared by the chat communication server, so that a position for character display that has not yet assigned to any user identifier will be assigned when a certain communication device 301 gains connection to the chat communication server. The user identifier and the position assigned to this user identifier (character display position) are broadcast to every communication device 301 that is connected to the chat communication server at that time. Each communication device 301 stores the received user identifier and the position assigned to this user identifier (character display position) in the RAM 103.

Other than this, in order to apply the present embodiment to an online game via a network, the position of a character controlled by each player may be directly acquired as the character display position.

Further, the character display position can also be pre-set by determining in step S403 in the above-described embodiment whether the received instruction is an instruction for moving the character, moving the user's own character image in a case where determined that the received instruction is an instruction for moving the character, and broadcasting the position reached by this moving operation to other communication devices 301.

The display unit 308 displays the acquired character image at the acquired character display position.

At this time, it is preferred that the figure represented by the background image information be adequately expanded or reduced, so that the letter string can be neatly contained in the figure represented by the background image information. Further, it is preferred that the display image be arranged near the character image.

FIG. 9 and FIG. 10 are explanatory diagrams showing display examples in a case where a chat process is displayed by "a character and a speech balloon" of the present embodiment. In the display examples shown in FIG. 9, the character of the user him/herself is displayed in addition to the character (character image) of the chat partner and the partner's speech (display image). In the display example shown in FIG. 10, a scene where chats are exchanged among many users, is represented.

In FIG. 9A to FIG. 9D and in FIG. 10, letter strings are displayed in speech balloons having a shape corresponding to each strength information and in the font size corresponding to each strength information.

By applying the technique of the present embodiment, it is possible to know how excited the user is, whether or not the user gets emotional, and whether or not the user wants to transmit a message with a strong willpower. This contributes to developing a deeper communication.

Another Embodiment

Figure 11:
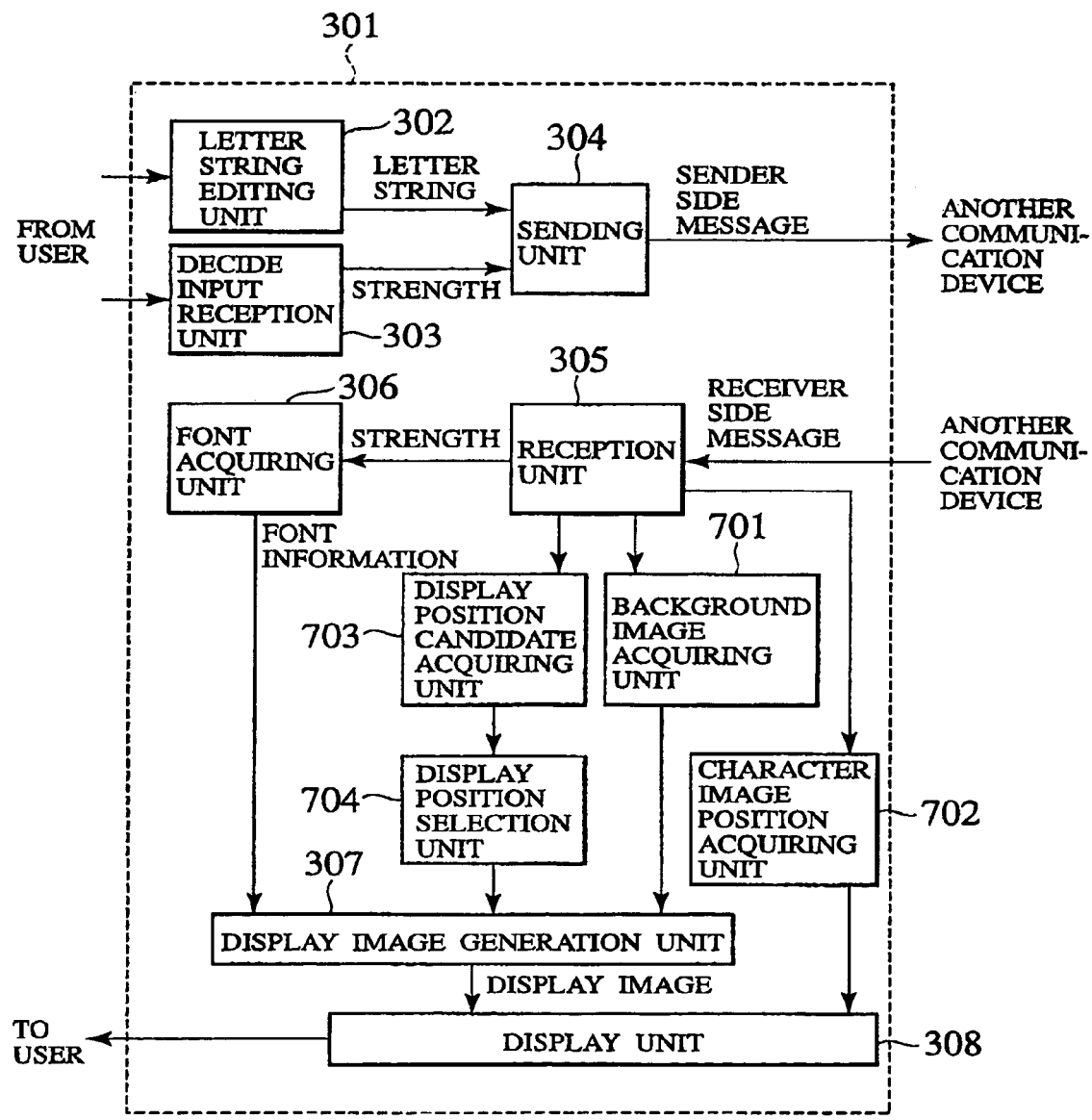
FIG. 11 is a diagram showing a schematic structure of a communication device according to another embodiment of the present invention.

FIG. 11 is a diagram showing a schematic structure of a communication device according to a yet another embodiment of the present invention. The following explanation will be made with reference to FIG. 11.

In the present embodiment, a display position candidate acquiring unit 703 and a display position selection unit 704 are further comprised in addition to the components of the above-described embodiments.

The display position candidate acquiring unit 703 acquires a plurality of display position candidates associated with a user identifier specified in a receiver side message.

According to the present embodiment, there are given plural pairs of directions and distances, and the display position candidate acquiring unit 703 acquires as a display position candidate, a position which is reached by getting far from an acquired character display position in a direction specified in a pair by a distance specified in the same pair. The display position candidate acquiring unit 703 acquires such a position for each pair.

Figure 12:
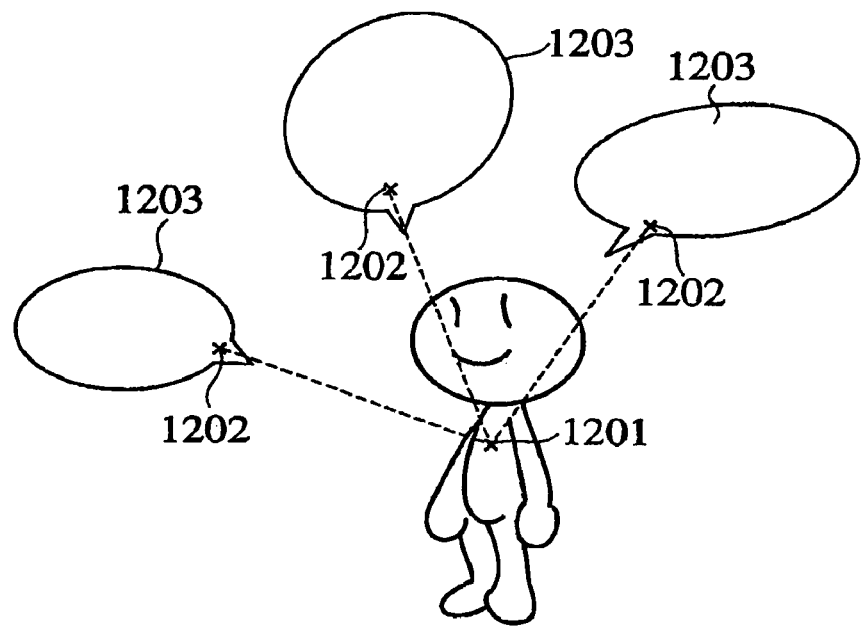
FIG. 12 is an explanatory diagram showing a positional relationship among a character image, a character display position, display position candidates, and display images (balloon images) to be displayed in the respective display position candidates.

FIG. 12 is an explanatory diagram showing a positional relationship among a character image, a character display position, display position candidates, and display images (balloon images) which are to be displayed at the respective display position candidates.

As shown in FIG. 12, three relative display position candidates 1202 are prepared for a character display position 1201. FIG. 12 shows a state where display images 1203 having various shapes are arranged at the respective display position candidates 1202.

The display images 1203 may have the same shape, or may have approximately the same shape and approximately the same size in accordance with the positional relationships between the character display position 1201 and the respective display position candidates 1202. In FIG. 12, the positions of the "horns" sticking out from the balloons towards the character are different, and the angles of displaying the balloons are different. However, the basic shape of the balloons is an oval, and the size of the balloons is approximately the same.

The display position selection unit 704 positions the display image corresponding to the user identifier concerned, at the respective display position candidates, in order to calculate an overlap area occupied together by any already-displayed display image corresponding to a user identifier other than the user identifier concerned and by the display image at the respective display position candidates, and selects one display position candidate at which the display image occupies the smallest overlap area together with any already-displayed display image.

In a case where there are more than one display position candidates at which the overlap area becomes the smallest (typically, in a case where there are more than one display position candidates at which the display image does not at all overlap with another already-displayed balloon image), the display position selection unit 704 may select any of such candidates by a random number, or may prioritize the display position candidates 1202 in advance to select one candidate in accordance with the priority order, or may select the display position candidates 1202 cyclically.

Figure 13:
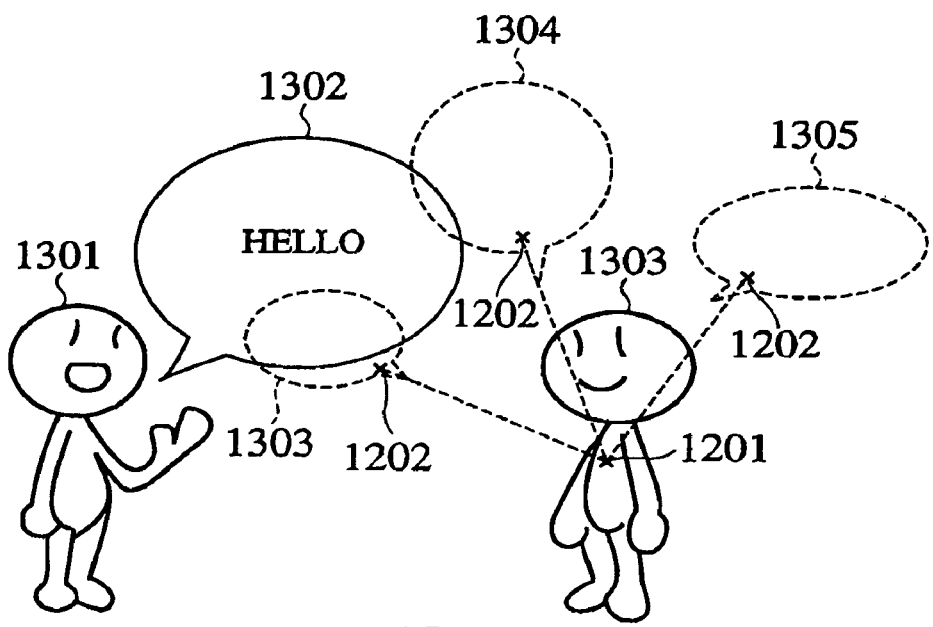
FIG. 13 is an explanatory diagram for explaining a method of selecting a display position candidate.

FIG. 13 is an explanatory diagram for explaining a method of selecting the display position candidates.

It is assumed that a display image (balloon image) 1302 is already displayed for a character image 1301, as shown in FIG. 13. Also, in FIG. 13, states of display images (balloon images) provisionally positioned at the respective display position candidates of a character image 1303, are shown by shapes 1303, 1304, and 1305 formed by broken lines.

When comparing the area occupied together by the display image 1302 and the shape 1303, the area occupied together by the display image 1302 and the shape 1304, and the area occupied together by the display image 1302 and the shape 1305, it is obvious that the area occupied together by the display image 1302 and the shape 1305 is the smallest. Therefore, the display position selection unit 704 selects the display position candidate corresponding to the shape 1305.

Figure 14:
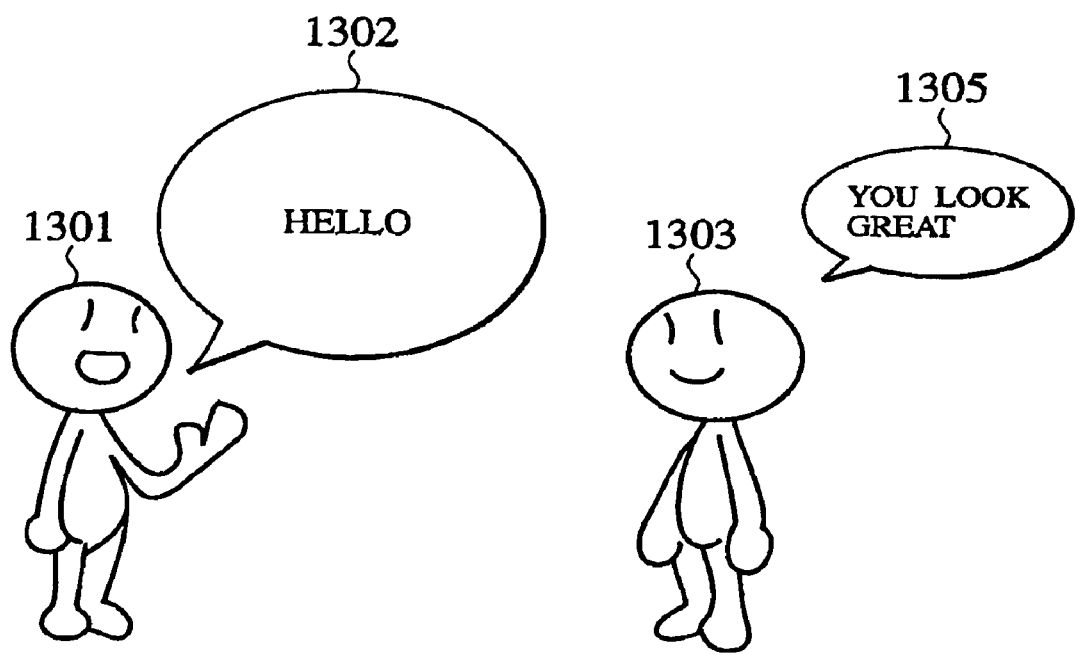
FIG. 14 is an explanatory diagram showing a state where a display image is displayed at a selected display position candidate.

Then, the display unit 308 displays the display image corresponding to the user identifier concerned, at the selected display position candidate. As a result, an image shown in FIG. 14 is displayed.

According to the present embodiment, it is possible to make the user easily observe the chat process, by taking as much care as possible so that display images (balloon images) do not overlap.

Another Embodiment

The present embodiment is an embodiment in which the above-described embodiments are applied to chat communication between players' characters put in a virtual three-dimensional space.

In the present embodiment, the display position candidate acquiring unit 703 acquires a plurality of display position candidates that are associated with a user identifier specified in a receiver side message, and that are positions included in the virtual three-dimensional space. Such display position candidates are equal to the two-dimensional display position candidates shown in FIG. 12 that are expanded in the three-dimensional space in a natural way.

In this case, a display image can be expressed as one plate-like polygon having a shape and size acquired in the above-described way. A received letter string is depicted on the surface of this plate-like polygon in accordance with acquired font information.

The display position selection unit 704 makes a calculation for each of the plurality of display position candidates, in order to calculate "the smallest value of an angle formed by a vector extending from a predetermined viewpoint to each display position candidate in the virtual three-dimensional space, and by a vector extending from the predetermined viewpoint to a position in the virtual three-dimensional space of any already-displayed display image corresponding to a user identifier other than the user identifier concerned", and selects a display position candidate whose calculated smallest value is the largest of all. By making such a selection, the overlap of display images can automatically be minimized.

The display unit 308 displays a rendered image of the display image corresponding to the user identifier concerned, that is positioned at the selected display position candidate in the virtual three-dimensional space and that is seen from the predetermined viewpoint.

If a Z-buffer rendering method is used, the display image of a character who is positioned in a remoter place is displayed as much smaller, and the display image of a character who is positioned in a nearer place is displayed as much larger.

Because of this, it is possible to realize chat environments corresponding to real world situations where "even if you cry out in a loud voice, someone far apart from you can not hear you clearly", or "even if you whisper in a small voice, someone near you can hear you and someone apart from you can not hear you at all".

In a case where the size when seen from the predetermined viewpoint, of the display image corresponding to the user identifier concerned that is arranged at the selected display position candidate in the virtual three-dimensional space, is smaller than a predetermined smallest size, the display unit 308 may expand the display image to have a size equal to or larger than the predetermined smallest size, so that everyone participating in the chat communication can see the contents of the chat.

Specifically, the smallest font size may be determined, and a value obtained by dividing "the smallest font size" by "the font size of a case where the display image corresponding to the user identifier concerned is seen from the predetermined viewpoint", may be determined as an expansion rate.

Another Embodiment

A communication device according to the present embodiment further comprises a display time acquiring unit (not shown) in addition to the components included in the above-described embodiments.

The display time acquiring unit acquires a display time which is associated in advance with strength information specified in a receiver side message. The correspondence between strength information and display time is pre-stored in a DVD-ROM or the like. It is preferred that the larger the strength information is, the longer the display time is.

The display unit 308 starts display of a generated display image, and finishes display of this display image when the acquired display time elapses.

Due to this, in a chat environment where a speech is deleted from the screen when a certain time elapses, it is possible to vary the length of the time until before the deletion in accordance with the strength information for the speech. This characteristic corresponds to a tendency in a daily conversation that "a speech made in a louder voice tends to give a longer-lasting impression".

As described above, according to the present invention, it is possible to provide a communication device 301 suitable for easily acquiring and transmitting information such as the degree of excitation of a user, etc., and presenting this information to the communication partner, and a program and a communication method for realizing this communication device by a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-287536 filed on Sep. 30, 2002 and including specification, claims, drawings and summary. The disclosure of the above Japanese Patent Application is incorporated herein by reference in its entirety.

What is claimed is:

1. A communication device comprising:

a letter string editing unit that receives edit instructions for editing a letter string from a user by pressing keys of a keyboard or buttons of a controller together with an operation strength with which the user presses the keys of the keyboard or the buttons of the controller for inputting the edit instruction, and edits the letter string in accordance with the edit instruction;

a decide input reception unit that receives a decide instruction from the user;

a sending unit that sends a sender side message specifying the edited letter string and strength information specifying the average or the weighed average of the operation strength, the average or the weighted average of the operation strength being dynamically updated every time the user presses any of the keys of the keyboard or the buttons of the controller for inputting the edit instruction, in a case where the decide instruction is received, to another communication device which is communicably connected to said communication device via a computer network;

a reception unit that receives a receiver side message specifying a letter string to be displayed and strength information from another communication device communicably connected to said communication device via the computer network;

a font acquiring unit that acquires font information designating a font having a size which is pre-associated with the average or the weighed average of the operation strength with which the user presses the keys or the buttons for inputting the edit instruction, the average or the weighted average of the operation strength being dynamically updated every time the user presses any of the keys of the keyboard or the buttons of the controller for inputting the edit instruction, and the strength information specified in the receiver side message received from said another communication device, the font information being acquired every time the user presses any of the keys or the buttons or said reception unit receives a receiver side message;

a display image generation unit that generates a display image every time the user presses any key of the keys or the buttons or said reception unit receives a receiver side message, by depicting the letter string to be edited currently with the acquired font for the average or the weighed average of the operation strength and depicting the letter string specified in the receiver side message with the acquired font for the strength information specified in the receiver side message; and a display unit that displays the generated display image.

2. The communication device according to claim 1, further comprising:

a background image acquiring unit that acquires background image information which is pre-associated with the strength information specified in the receiver side message; and wherein, said display image generation unit displays the display image by depicting the letter string specified in the receiver side message in accordance with the acquired background image information, and by overlaying the letter string on the acquired background image information.

3. The communication device according to claim 1, further comprising:

a display time acquiring unit that acquires a display time which is pre-associated with the strength information specified in the receiver side message; and wherein said display unit finishes display of the generated display image, when the acquired display time passes after display of the display image is started.

4. The communication device according to claim 1, further comprising a display position candidate acquiring unit and a display position selection unit, wherein:

said sending unit sends the sender side message in which a user identifier assigned to the user is further specified;

a user identifier is further specified in the receiver side message received by said reception unit;

said display position candidate acquiring unit acquires a plurality of display position candidates which are associated with the user identifier specified in the received receiver side message;

said display position selection unit provisionally displays the display image corresponding to the user identifier specified in the receiver side message, at the respective acquired display position candidates, in order to calculate an overlap area which is occupied together by any already-displayed display image corresponding to a user identifier other than the specified user identifier and by the provisionally-displayed display image at the respective acquired display position candidates, and selects one display position candidate at which the overlap area becomes the smallest of all the overlap areas calculated for the respective acquired display position candidates; and said display unit displays the display image corresponding to the specified user identifier at the selected display position candidate.

5. The communication device according to claim 4, further comprising a character image position acquiring unit, wherein:

said character image position acquiring unit acquires a character image and a character display position which are associated with the user identifier specified in the receiver side message;

said display position candidate acquiring unit refers to each of a plurality of pairs of directions and distances, and acquires as a display position candidate, a position which is apart from the acquired character display position in a direction in a pair, by a distance in the same pair; and said display unit further displays the acquired character image at the acquired character display position.

6. The communication device according to claim 1, further comprising a display position candidate acquiring unit and a display position selection unit, wherein:

said sending unit sends the sender side message in which a user identifier assigned to the user is further specified;

a user identifier is further specified in the receiver side message received by said reception unit;

said display position candidate acquiring unit acquires a plurality of display position candidates which are associated with the user identifier specified in the receiver side message and which are positions in a virtual three-dimensional space;

said display position selection unit calculates "a smallest value of an angle formed by a vector extending from a predetermined viewpoint to each of the plurality of acquired display position candidates in the virtual three-dimensional space, and by a vector extending from the predetermined viewpoint to a position in the virtual three-dimensional space of any already-displayed display image corresponding to a user identifier other than the user identifier specified in the receiver side message", and selects one display position candidate whose calculated smallest value is the largest of all the calculated smallest values; and said display unit displays a rendered image of the display image corresponding to the specified user identifier, which is arranged at the selected display position candidate in the virtual three-dimensional space, and which is seen from the predetermined viewpoint.

7. The communication device according to claim 6, wherein in a case where a size when seen from the predetermined viewpoint, of the display image corresponding to the specified user identifier which is arranged at the selected display position candidate in the virtual three-dimensional space, is smaller than a predetermined smallest size, the display unit expands the display image to have a size equal to or larger than the predetermined smallest size.

8. A communication method comprising the steps of:
receiving edit instructions for editing a letter string from a user by pressing keys of the keyboard or the buttons of the controller together with an operation strength with which the user presses the keys of the keyboard or the buttons of the controller for inputting the editing instruction, and editing the letter string in accordance with the edit instruction;
receiving a decide instruction from the user;
sending a sender side message specifying the edited letter string and strength information specifying the average or weighed average of the operation strength, the average or the weighted average of the operation strength being dynamically updated every time the user presses any of the keys of the keyboard or the buttons of the controller for inputting the edit instruction, in a case where the decide instruction is received, to another communication device via a computer network;
receiving a receiver side message specifying a letter string to be displayed and strength information from another communication device via the computer network;
acquiring font information designating a font having a size which is pre-associated with the average or the weighed average of the operation strength with which the user pressed the keys or the buttons for inputting the editing instruction, the average or the weighted average of the operation strength being dynamically updated every time the user presses any of the keys of the keyboard or the buttons of the controller for inputting the edit instruction, and the strength information specified in the receiver side message received from said another communication device, the font information being acquired every time the user presses any of the keys or the buttons or said reception unit receives a receiver side message;
generating a display image every time the user presses any of the keys or the buttons or a receiver side message is received, by depicting the letter string to be edited currently with the acquired font for the average or the weighed average of the operation strength and depicting the letter string specified in the receiver side message with the acquired font for the strength information specified in the receiver side message; and
displaying the generated display image.

9. A computer usable storage medium having a computer program for controlling a computer to function as:
a letter string editing unit that receives edit instructions for editing a letter string from a user by pressing keys of a keyboard or buttons of a controller together with an operation strength with which the user presses the keys of the keyboard or the buttons of the controller for inputting the edit instruction, and edits the letter string in accordance with the edit instruction;
a decide input reception unit that receives a decide instruction from the user;
a sending unit that sends a sender side message specifying the edited letter string and strength information the average or the weighed average of the operation strength, the average or the weighted average of the operation strength being dynamically updated every time the user presses any of the keys of the keyboard or the buttons of the controller for inputting the edit instruction, in a case where the decide instruction is received, to another communication device which is communicably connected to said communication device via a computer network;
a reception unit that receives a receiver side message specifying a letter string to be displayed and strength information from another communication device communicably connected to said communication device via the computer network;
a font acquiring unit that acquires font information designating a font having a size which is pre-associated with the average or the weighed average of the operation strength with which the user pressed the keys or the buttons for inputting the edit instruction, the average or the weighted average of the operation strength being dynamically updated every time the user presses any of the keys of the keyboard or the buttons of the controller for inputting the edit instruction, and the strength information specified in the receiver side message received from said another communication device, the font information being acquired every time the user presses any of the keys or the buttons or said reception unit receives a receiver side message;
a display image generation unit generates a display image every time the user presses any of the keys or the buttons or said reception unit receives a receiver side message, by depicting the letter string to be edited currently with the acquired font for the average or the weighed average of the operation strength and depicting the letter string specified in the receiver side message with the acquired font for the strength information specified in the receiver side message; and
a display unit that displays the generated display image.

* * * * *